US011423131B2

(12) United States Patent
Nygate et al.

(10) Patent No.: US 11,423,131 B2
(45) **Date of Patent: *Aug. 23, 2022**

(54) SYSTEMS AND METHODS FOR IMPROVING KBA IDENTITY AUTHENTICATION QUESTIONS

(71) Applicant: LexisNexis Risk Solutions Inc., Alpharetta, GA (US)

(72) Inventors: Tamir Nygate, Be'er Sheva (IL); Benny Rotem, Kibbutz Dvir (IL); Elina Yaakobovich, Mazkert Batya (IL)

(73) Assignee: LexisNexis Risk Solutions Inc., Alpharetta, GA (US)

( * ) Notice: Subject to any disclaimer, the term of this patent is extended or adjusted under 35 U.S.C. 154(b) by 129 days.

This patent is subject to a terminal disclaimer.

(21) Appl. No.: 17/080,421

(22) Filed: Oct. 26, 2020

(65) Prior Publication Data

US 2021/0056186 A1 Feb. 25, 2021

Related U.S. Application Data

(63) Continuation of application No. 16/675,611, filed on Nov. 6, 2019, now Pat. No. 10,891,360, which is a (Continued)

(51) Int. Cl.
*G06N 5/04* (2006.01)
*G06F 21/31* (2013.01)
(Continued)

(52) U.S. Cl.
CPC ........ *G06F 21/316* (2013.01); *G06F 16/2455* (2019.01); *G06F 16/3329* (2019.01);
(Continued)

(58) Field of Classification Search
CPC ........ G06F 21/30; G06F 21/31; G06F 21/316; G06F 21/50; G06F 17/30477; H04L 63/08; H04L 63/0838; G06N 99/005
See application file for complete search history.

(56) References Cited

U.S. PATENT DOCUMENTS 6,327,574 B1 12/2001 Kramer et al.
3,527,773 A1 9/2013 Metzger
(Continued)

OTHER PUBLICATIONS

Suganya, G., et al., "Proactive Password Strength Analyzer Using Filters and Machine Learning Techniques," International Journal of Computer Applications (0975-8887), vol. 7, No. 14, Oct. 2010.
(Continued)

*Primary Examiner* — Eric W Shepperd
(74) *Attorney, Agent, or Firm* — Troutman Pepper Hamilton Sanders LLP; James E. Schutz; Mark Lehi Jones

(57) ABSTRACT

Certain implementations include systems and methods for improving knowledge-based-authentication (KBA) identity authentication questions. A method is provided that includes receiving a set of identity information associated with a subject; querying one or more databases; receiving personally identifiable information; determining, from the personally identifiable information, at least one subject characteristic; producing, with a predictive model and based on the personally identifiable information and on the at least one subject characteristic, at least one knowledge-based authentication (KBA) identity proofing question having a personally identifiable correct answer; sending, for display on a first computing device associated with the subject, the at least one KBA identity proofing question; receiving, responsive to the sending, a response answer; and responsive to a match between the response answer and the personally identifiable correct answer, sending, for display on the first computing device associated with the subject, a first indication of authentication.

20 Claims, 6 Drawing Sheets

Related U.S. Application Data continuation of application No. 15/238,035, filed on Aug. 16, 2016, now Pat. No. 10,521,572.

(51) Int. Cl.

| | |
|---|---|
| ***G06N 20/00*** | (2019.01) |
| ***G06F 16/2455*** | (2019.01) |
| ***G06F 16/332*** | (2019.01) |
| ***G06N 5/02*** | (2006.01) |
| ***G06N 7/00*** | (2006.01) |

(52) U.S. Cl.

CPC ............. *G06F 21/31* (2013.01); *G06N 5/025* (2013.01); *G06N 5/04* (2013.01); *G06N 7/005* (2013.01); *G06N 20/00* (2019.01)

(56) References Cited

U.S. PATENT DOCUMENTS 8,533,815 B1* 9/2013 Upson ................... H04L 9/3228 713/168
8,776,195 B1 7/2014 Avni et al.
9,009,844 B1 4/2015 Corn et al.
9,021,553 B1* 4/2015 Corn ....................... G06F 21/31 726/2
9,047,473 B2 6/2015 Samuelsson et al.
9,078,129 B1 7/2015 Dotan et al.
9,177,127 B1 11/2015 Dotan et al.
9,183,595 B1 11/2015 Avni et al.
9,565,562 B1* 2/2017 Bar-Menachem .......................... H04W 12/065
9,633,322 B1 4/2017 Burger
9,674,195 B1* 6/2017 Jiang ....................... H04L 63/10
9,749,353 B1 8/2017 Benskin et al.
9,805,213 B1* 10/2017 Kragh .................. G06F 16/245
2003/0212909 A1 11/2003 Chandrashekhar et al.
2007/0172063 A1 7/2007 Biggs et al.
2008/0216172 A1 9/2008 Forman et al.
2008/0249947 A1 10/2008 Potter
2009/0192966 A1 7/2009 Horvitz et al.
2009/0265773 A1* 10/2009 Schultz ............... G06F 16/9535 726/7
2010/0017875 A1 1/2010 Harakawa
2011/0191838 A1 8/2011 Yanagihara
2012/0102551 A1 4/2012 Bidare
2012/0180124 A1 7/2012 Dallas et al.
2012/0191621 A1 7/2012 Williams et al.
2012/0311684 A1 12/2012 Paulsen et al.
2013/0061285 A1* 3/2013 Donfried ............... G06F 21/316 726/3
2013/0117280 A1 5/2013 Donaldson et al.
2013/0191898 A1 7/2013 Kraft
2013/0225129 A1 8/2013 Norbisrath
2013/0333008 A1 12/2013 Tapling et al.
2013/0347129 A1 12/2013 Samuelsson et al.
2014/0041000 A1 2/2014 Rolfe
2014/0129493 A1 5/2014 Leopold
2014/0137203 A1 5/2014 Castro et al.
2014/0189829 A1* 7/2014 McLachlan ............. H04L 63/08 726/6
2014/0201836 A1 7/2014 Amsler
2014/0278754 A1 9/2014 Cronin et al.
2014/0298199 A1 10/2014 Johnson et al.
2014/0380444 A1 12/2014 Kelley
2015/0161375 A1 1/2015 Ghosh et al.
2015/0186632 A1 7/2015 Liu et al.
2016/0036807 A1* 2/2016 Knauss ............... H04L 63/0838 726/7
2016/0350870 A1 2/2016 Morin et al.
2016/0127374 A1 5/2016 O'Connell et al.
2017/0249557 A1 8/2017 Tendick
2017/0330165 A1 11/2017 Banerjee et al.

OTHER PUBLICATIONS

PCT/US2017/44895 International Search Report and Written Opinion, dated Oct. 18, 2017.

Neville, Padraic G. "Decision Trees for Predictive Modeling", published on Aug. 4, 1999, SAS Institute Inc., 1999.

PCT/US2017044895 Supplementary European Search Report and Written Opinion EP17841840, dated Jun. 24, 2020.

* cited by examiner

SYSTEMS AND METHODS FOR IMPROVING KBA IDENTITY AUTHENTICATION QUESTIONS

CROSS-REFERENCE TO RELATED APPLICATIONS

This application is a continuation of U.S. patent application Ser. No. 16/675,611, filed 6 Nov. 2019, and published as U.S. Patent Publication No. US20200074054 on 5 Mar. 2020. U.S. patent application Ser. No. 16/675,611 is a continuation of U.S. patent application Ser. No. 15/238,035, filed 16 Aug. 2016, and issued as U.S. Pat. No. 10,521,572 on 31 Dec. 2019. The entire contents of these applications are incorporated herein by reference.

FIELD OF THE DISCLOSED TECHNOLOGY

This disclosed technology generally relates to identity authentication, and in particular, to improving knowledge-based authentication (KBA) questions based on subject attributes.

BACKGROUND OF THE DISCLOSED TECHNOLOGY

Identity verification is often used by businesses and governmental agencies to ensure that subjects provide information that is uniquely associated with their real identity. Certain forms of identity verification may rely on physical or documentary documents, such as a driver's license, utility bill, etc. However, many online situations exist where physical documentary verification is not feasible. In such cases, non-documentary information can be provided by a subject and utilized for identity verification. However, fraud perpetrators may attempt to overcome the identity verification by providing synthetic, stolen, or manipulated identity information.

Knowledge-based authentication (KBA) is an authentication process that can provide enhanced security and can be effective in thwarting fraudsters. KBA is a process in which the subject is asked to answer at least one question based on the subject's own knowledge. A good KBA question should not be easily guessed or determined through research, and it should have only one correct answer that a subject can easily remember. The form and content of the KBA question, therefore, can vary widely, with a corresponding wide range of usability and effectiveness.

Balancing the threats of identity fraud with efficient identity verification service for legitimate clients continues to present significant challenges for businesses and governmental agencies.

BRIEF SUMMARY OF THE DISCLOSED TECHNOLOGY

Some or all of the above needs may be addressed by certain implementations of the disclosed technology. Systems and methods are disclosed herein for improving and/or refining knowledge-based authentication (KBA) questions. Certain example implementation of the disclosed technology may improve efficiency, speed, and/or security associated with an identity authentication process.

In an example implementation, a computer-implemented method is provided that includes receiving a set of identity information associated with a subject; querying one or more databases with at least a portion of the set of identity information; receiving, in response to the querying, personally identifiable information; determining, from the personally identifiable information, at least one subject characteristic; producing, with a predictive model executing on one or more computer processors, and based at least in part on the personally identifiable information and on the at least one subject characteristic, at least one knowledge-based authentication (KBA) identity proofing question having a personally identifiable correct answer. Certain embodiments can include sending, for display on a first computing device associated with the subject, the at least one KBA identity proofing question; receiving, responsive to the sending, a response answer; and responsive to a match between the response answer and the personally identifiable correct answer, sending, for display on the first computing device associated with the subject, a first indication of authentication.

According to another example implementation, a system is provided. The system includes at least one memory for storing data and computer-executable instructions; and at least one processor configured to access the at least one memory and further configured to execute the computer-executable instructions to: receive a set of identity information associated with a subject; query one or more databases with at least a portion of the set of identity information; receive, in response to the querying, personally identifiable information; determine, from the personally identifiable information, at least one subject characteristic; produce, with a predictive model, and based at least in part on the personally identifiable information and on the at least one subject characteristic, at least one knowledge based authentication (KBA) identity proofing question having a personally identifiable correct answer; send, for display on a first computing device associated with the subject, the at least one KBA identity proofing question; receive, responsive to the sending, a response answer; and responsive to a match between the response answer and the personally identifiable correct answer, send, for display on the first computing device associated with the subject, a first indication of authentication.

According to another example implementation, computer-readable media is provided. The computer-readable media includes computer-executable instructions that, when executed by one or more processors, cause the one or more processors to perform the method, as described above.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
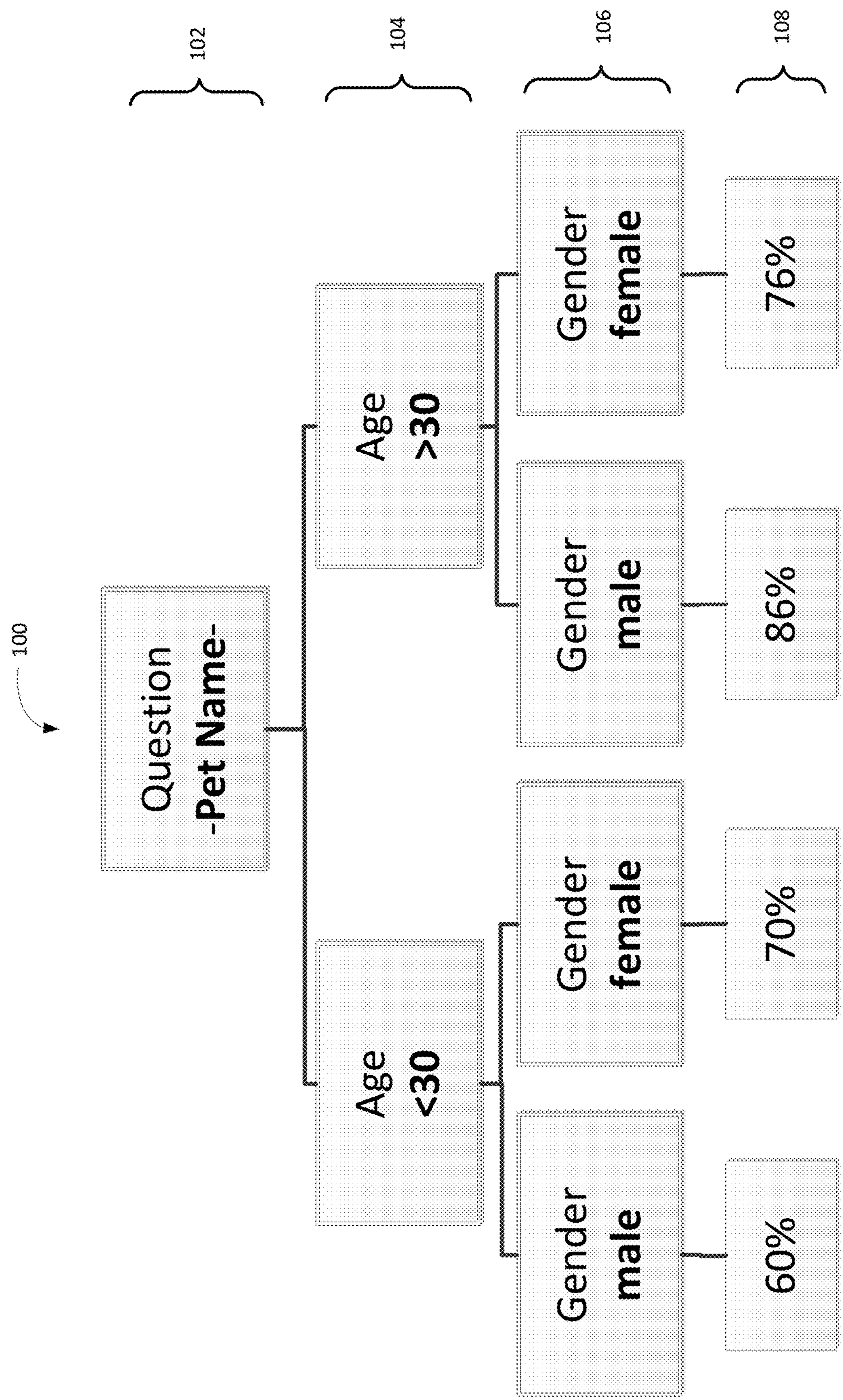
FIG. 1 depicts an example decision tree 100 for determining a success rate for a particular KBA question topic, according to an example implementation of the disclosed technology.

Implementations of the disclosed technology will be described more fully hereinafter with reference to the accompanying drawings, in which various embodiments of the disclosed technology are depicted. This disclosed technology may, however, be embodied in many different forms and should not be construed as limited to the implementations set forth herein; rather, these implementations are provided so that this disclosure will be thorough and complete, and will convey the scope of the disclosed technology to those skilled in the art.

Certain example implementations of the disclosed technology may be utilized to improve security and efficiency of identity authentication processes by improving knowledge-based authentication (KBA) questions. In certain example implementations, the KBA questions may be presented to a subject during an identity authentication process. The term "subject" as used herein may refer to a natural person. Certain example implementations of the disclosed technology may provide enhanced authentication reliability for a subject. Certain example implementations of the disclosed technology may be utilized for an initial application/verification process, such as for obtaining credit, establishing an account, etc. Certain example implementations of the disclosed technology may be utilized to verify a subject's identity, for example, after an initial application or authentication process has been conducted.

In accordance with an example implementation of the disclosed technology, a KBA question topic may be selected, for example, based on at least one subject characteristic, such as age, gender, etc. In certain example implementations, a predictive model, such as decision tree learning, may be utilized to refine and improve the KBA question and/or the associated question topic to provide a higher likelihood that an authentic subject will correctly answer the selected and presented KBA question, given known characteristics associated with the subject.

According to certain example implementations of the disclosed technology, the question topic may be utilized to select and/or generate a KBA question. In certain example implementations, the KBA question topics may be categorized into broad topic themes including, but not limited to: property/residence/address-related topics, birthdate-related topics, vehicle-related topics, miscellaneous topics such as corporate affiliation, personal information, etc. Other topic themes may be utilized without departing from the scope of the disclosed technology.

Table 1 below lists some example property/residence/address-related topics that may be utilized for generating and/or selecting a KBA question, according to certain example implementations of the disclosed technology.

TABLE 1

| Example Property/Residence/Address Topics | |
|---|---|
| Property Lender | Property Loan Amount |
| Residence City and/or Previous Cities | Residence Street |
| Year of Residence in a City | Residence Country and/or Countries |
| Residence Subdivision | Property size (square feet, etc.) |
| Property Purchase Date | Property Purchased from Seller |
| Number of Full Bathrooms at Property | Hospital Near Property |
| School Near Property | Property Zoning |
| Neighborhood Information | Neighbor name |

Table 2 below lists some example birthdate-related topics that may be utilized for generating and/or selecting a KBA question, according to certain example implementations of the disclosed technology.

TABLE 2

| Example Birthdate Topics | |
|---|---|
| Month of Birth | Zodiac Sign |
| Current age | Birth State |
| Birth City | Birth Hospital |
| Address at Birth | Name on Birth Certificate |

Table 3 below lists some example vehicle-related topics that may be utilized for generating and/or selecting a KBA question, according to certain implementations of the disclosed technology.

TABLE 3

| Example Vehicle Topics | |
|---|---|
| Make of Vehicle | Model of Vehicle |
| Color of Vehicle | Dealer for Vehicle Purchase |
| Driver's License Number | Aircraft Owned |
| Watercraft Owned | Motorcycle Owned |
| County of Vehicle Registration | Vehicle Accident Information |
| Vehicle Insurance Carrier Information | Vehicle Tag Information |

Table 4 below lists some example miscellaneous topics that may be utilized for generating and/or selecting a KBA question, according to certain example implementations of the disclosed technology.

TABLE 4

| Example Miscellaneous Topics | |
|---|---|
| E-mail address | Domain Name |
| Internet Service Provider | Cellular Carrier |
| Roommates | Siblings |
| Spouse | Professional License |
| State that issued Social Security No. | Work affiliations |
| Pets | Etc. |

In certain example implementations, a KBA question and a personally identifiable correct answer to the KBA question may be determined. For example, a KBA question and/or personally identifiable correct answer may be determined or generated responsive to receiving a set of identity information associated with the subject, querying one or more databases with at least a portion of the set of identity information, receiving personally identifiable information, and processing the personally identifiable information.

In certain example implementations, a KBA question and/or personally identifiable correct answer may be determined based on at least one subject characteristic or attribute associated with the subject. Table 5 below lists some example subject characteristics that may be utilized for generating a KBA question, selecting a KBA question, and/or determining a personally identifiable correct answer to the KBA question, according to certain example implementations of the disclosed technology.

TABLE 5

| Example Subject Characteristics | |
|---|---|
| Age | Gender |
| Zip Code | Duration in Current Address |
| Address type | Residence Name |
| Previous Address Count | Months overlapping with other addresses |
| Culture | Personal Communication Devices |
| Vehicles | Residence Address type |
| Purchased price of Residence | Residence Building type |
| Residence Building Year | Residence Number of Owners |
| Residence Construction Type | Duration since Residence purchase date |
| Property Transaction Count | Car Year, Make, Model, and/or VIN |
| Current Vehicle | Previous Vehicle |
| New or Used Car | Personal Computing Devices |

The utilization of the various topics and subject characterizations will now be explained by way of the following examples.

FIG. 1 depicts an example decision tree 100 that may be utilized for determining a success rate for a particular KBA question based on certain question topics (such as those listed in Tables 1-4) and subject characteristics (such as those listed in Table 5). In accordance with an example implementation of the disclosed technology, metrics regarding the pass/fail rate of the question topic may be evaluated using one or more learning models and/or decision tree(s) and related to the subject characteristic. In certain example implementations, the evaluation of such information may be utilized to refine and/or select the type of KBA questions that may be presented to a subject based on the known subject characteristic or characteristics (which may be further based on the initial set of identity information provided by a subject). Thus, certain implementations of the disclosed technology may provide the technical benefit of improving the pass-rate of an authentic subject in a KBA authentication process by generating KBA questions that are statistically more likely for that particular subject (i.e., user or applicant) to correctly answer. In certain example implementations, the refinement and/or selection of KBA questions may be based on information that a subject is more likely to remember, given known characteristics about the subject.

The example decision tree 100, as depicted in FIG. 1 represents an example of metrics for a KBA question topic 102 specifically related to a pet name. In this example, the decision tree 100 is divided (at the second level of the tree 100) into two groups representative of a first subject characteristic 104 specifically related to age: i.e., those subjects over 30 years of age, and those subjects under 30 years of age. At the third level of the tree 100, each of the age groups in the second level may then be divided by a second subject characteristic 106 specifically related to gender: i.e., males and females. The KBA question pass results 108 for this example indicate that subject characteristics 104 106 such as age and gender can influence the pass rate 108 related to certain KBA question topics 102. For example, to increase the success rate of successfully answering a pet name question, it may make sense to present such a question to males over 30. On the other hand, and as will be illustrated below, a question regarding a favorite color may be a better question to ask for all females.

Figure 2:
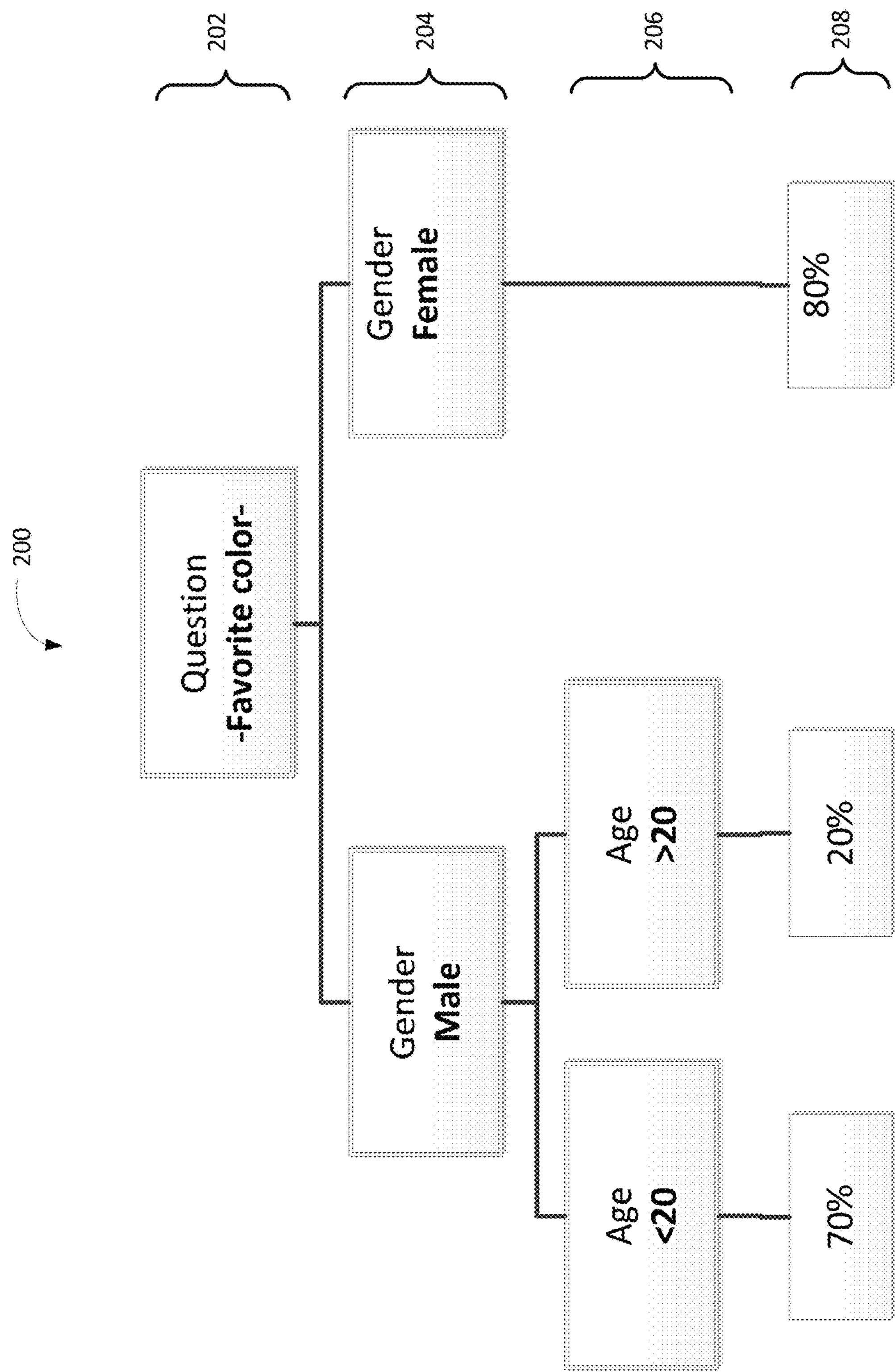
FIG. 2 depicts another decision tree 200 for determining a success rate for another particular KBA question topic, according to an example implementation of the disclosed technology.

The example decision tree 200, as depicted in FIG. 2 represents another KBA question topic 202 specifically related to color, with associated metrics. In this example, the decision tree 200 is divided (at the second level of the tree 200) into two groups representative of a first subject characteristic 204 specifically related to gender: i.e., males and females. At the third level of the tree 200, the male gender group may then be divided by a second subject characteristic 206 specifically related to age: i.e., those male subjects over 20 years of age, and those male subjects under 20 years of age. In this example, a pass rate 208 of 80% for the females may be substantially the same across age groups, so it may not be necessary to divide the females by age at this level in the tree 200. The KBA question pass results 208 for this example indicate that subject characteristics 204 206 such as gender and age can influence the pass rate 208 related to certain KBA question topics 102. For example, to increase the success rate of successfully answering a KBA question related to a favorite color, it may make sense to select such a question topic for presenting the KBA question to females and to avoid asking such a question to males over age 20.

To illustrate the use of the disclosed technology further, and with continued reference to FIGS. 1 and 2, consider the hypothetical situation (for simplicity sake) in which only two question topics are used for the KBA question: pet name or favorite color; and for which only two characteristics about the subject are collected: gender and age. After the decision tree learning period is completed for data collected on a given population of subjects, the "pet name" and "favorite color" (topics) KBA questions may be analyzed for correlation with gender and age (subject characteristics) to determine a probability for passing. Table 6 summarizes the metrics for the pet name KBA question, and Table 7 summarizes the metrics for the favorite color KBA question.

TABLE 6

Example Pet Name Question Metrics

| Gender | Age | Pass rate |
|---|---|---|
| Male | Above 30 | 86% |
| Female | Above 30 | 76% |
| Male | Under 30 | 60% |
| Female | Under 30 | 70% |

Based on the metrics shown in Table 6, the model may be utilized to conclude that that age is a more influential subject characteristic than the gender characteristic for a pet name KBA question, but that gender is also influential.

TABLE 7

Example Favorite Color Question Metrics

| Gender | Age | Pass rate |
|---|---|---|
| Male | Above 20 | 50% |
| Female | Above 20 | 80% |
| Male | Under 20 | 70% |
| Female | Under 20 | 80% |

Based on the metrics shown in Table 7, the model may conclude that that gender is more influential subject characteristic than the age characteristic for a favorite color KBA question.

In accordance with an example implementation of the disclosed technology, metrics for pass rates may be gathered and analyzed using decision trees and/or other learning models to decide which KBA questions and associated topics will be presented to a subject based on characteristics of the subject. Certain example implementations of the disclosed technology may be implemented in steps or phases. For example, phase 1 may include data collection; phase 2 may include analysis of the collected data and learning the relationship between the KBA question topics and the subject characteristics in terms of pass results; and phase 3 may include an ongoing gathering of data and refinement of the learning model(s).

According to an example implementation of the disclosed technology, information and facts about a subject may be gathered, and the outcome (pass or fail) of prototype KBA questions may be analyzed with a decision tree and/or model for each question to determine the probability of passing a particular type of KBA question based on subject characteristics. In certain example implementations, the model may rank the questions that are more likely to be successfully passed by the genuine user.

According to an example implementation of the disclosed technology, additional factors may be utilized in the model and/or learning tree to detect and suppress KBA questions that have a high pass rate due to answers that could be easily guessed or determined by research by someone other than an authentic subject. In one example implementation, false-positive results may be determined by the model so that KBA questions having a higher pass rate and low false-positive rate are presented to the subject, thereby increasing the security of the KBA authentication process. For example, and as an illustration of a static scheme, a subject may pre-select the question subjects that he/she would like to be asked in future authentication, and the subject may provide the correct answers to the selected questions. The question/answer pairs may be stored by the host and used later to verify the person's identity. The KBA questions can be factual, such as: "Where did you spend your honeymoon?" or "How many pets do you have?" The KBA questions can be about preferences, such as: "What is your favorite food?" or "Who was your favorite teacher?" One issue with such static KBA questions is that a spouse, friend, sibling, and/or colleague of the subject may have enough information to provide a correct answer. Also, if the subject has shared such information on a social media site, the correct answer could be easily researched.

On the other hand, in a dynamic scheme, and according to an example implementation of the disclosed technology, the subject may have no idea what KBA question will be asked. Instead, the question/answer pairs may be determined by harvesting data from public and/or private records. For example, dynamic KBA questions may take the form of: "What was your street address when you were 10 years old?" or "What color Ford Mustang was registered to you in New York State in 2002?" Although the answers to such dynamic questions could be researched, it may take time. According to an example implementation of the disclosed technology, if the respondent does not answer the dynamic question within a certain time period, the question may be discarded and treated as a wrong answer.

According to certain example implementations of the disclosed technology, the KBA question may be based on retrieved information, for example, from one or more of:

- shared secrets provided by the user in a previous session;
- private data about the user or account held by an organization such a transactional activity, account opening date, or co-owners of the account;
- aggregated data from sources such as commercially available data, credit file information such as tradeline data, and/or credit bureau data that may include address history, relatives, property ownership, etc.;
- aggregated from public records, for example, from county tax and property records, court records, driver's license records, utility records, etc.

In certain example embodiments, the KBA question may be based on derived data from the retrieved information. For example, a public record source may be utilized to retrieve an address of the subject, and then geospatial data may be utilized to find business around the address to generate a KBA question such as: "Which of the following hospitals is closest to your home address?"

According to an example implementation, the KBA question may be sent to a subject using various so-called "out-of-band" communication channels or combinations of channels such as by phone, email, physical mail, SMS messaging, URL access, etc. For example, in one implementation, the KBA question may be sent or presented to a subject using one communication channel or device (such as via a browser on a desktop computer) while corresponding answer codes may be sent or presented to the subject using another communication channel or device (such as via a text message on a smartphone). Such multi-channel/device communications may provide a "possession" factor for security in an authentication process.

In accordance with an example implementation of the disclosed technology, a "knowledge" factor may be provided via the KBA authentication implementation. The "knowledge" factor provided by the KBA may add another layer of security in addition to the above-mentioned "possession" factor. KBA questions are sometimes referred to as "out-of-wallet" and may be used to verify "something that the subject knows" in the authentication process. Certain example implementations of the technology may include a KBA question that is suitable for a fill-in-the-blank answer by a subject. Certain example implementations may include a KBA question that is suitable for a multiple-choice answer by a subject.

As discussed above with respect to FIGS. 1 and 2, decision tree learning may be utilized as a predictive model to map relationships among KBA question topics, subject characteristics, and a corresponding pass/fail rate of answers received from subjects for improving the efficacy of the KBA question. In certain example implementations, the decision tree may be used as predictive modeling approach for data mining, machine learning, and/or to determine statistics regarding the KBA question(s). In certain example implementations, the tree models may work on target variables in which the "leaves" can represent class labels, while the "branches" can represent conjunctions of features that lead to those class labels.

According to an example implementation of the disclosed technology, a tree and its corresponding KBA question pass/fail rates may be determined by splitting the source set into subsets based on the subject characteristics. Such a process may be repeated on each derived subset in a recursive manner called recursive partitioning. In accordance with an example implementation of the disclosed technology, the recursion may be completed when the subset at a node has all the same value of the subject characteristics, or when continued splitting no longer adds value to the predictions.

In an example implementation, the learning tree may be applied to understand, classify, or generalize the contribution of a subject characteristic (such as age, gender, etc.) on a success rate for a particular KBA question topic.

In an example implementations, a statistical classifier, such as ID4.5 (also known as a C4.5) algorithm may be utilized for generating and processing the decision trees. See for example, Quinlan, J. R. "*C4.5: Programs for machine learning*," Morgan Kaufmann Publishers, San Mateo (1993), and Wu, et al., "*Top* 10 *algorithms in data mining*," Published online: 4 Dec. 2007, ©Springer-Verlag London Limited (2007), the contents of these publications are incorporated herein by reference, as if presented in full.

Figure 3:
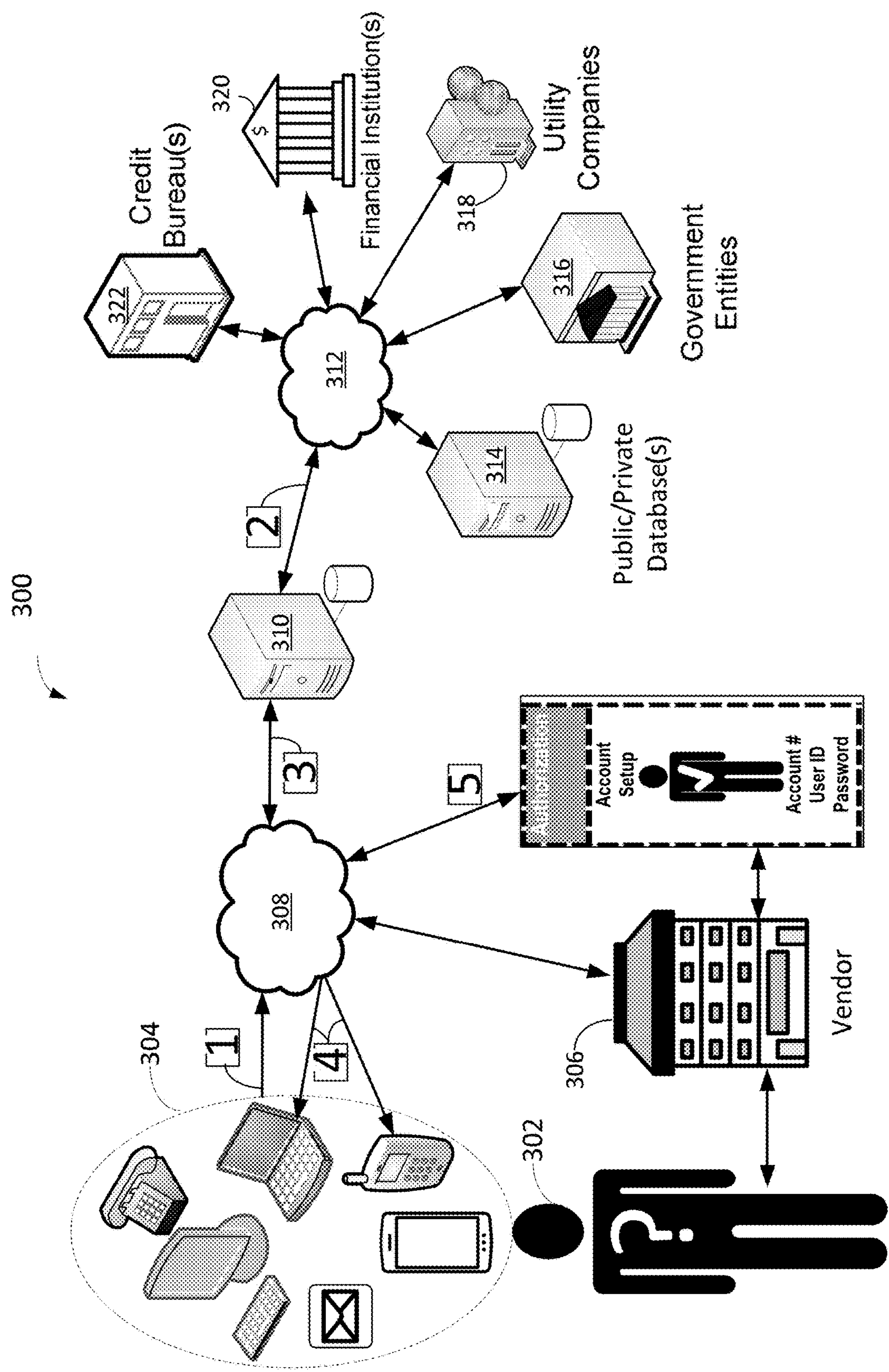
FIG. 3 is a block diagram of an illustrative identity authentication process 300 according to an example implementation of the disclosed technology.

FIG. 3 depicts an illustrative identity authentication process 300, according to an example implementation of the disclosed technology. Certain example implementations of the process 300 may be used to verify the identity of the subject 302 using a KBA authorization process with learning and refinement.

According to an example implementation, the subject 302 may provide identity information for initiating the authentication process 300 using one or more communication channels and/or devices 304. For example, in one implementation, the set of identity information may include basic details, such as a name, address, date of birth, social security number, location, etc. In certain example embodiments, the subject 302 may provide a set of identity information (such as will be discussed with reference to FIG. 4 below) via a telephone, desktop computer, smart-phone, laptop computer, tablet-computing device, paper application, mail, etc. In certain example implementations, all or a portion of the set of identity information may be input directly into one or more webpage forms for online processing. In certain example implementations, all or part of the set of identity information related to the subject 302 may be stored with a vendor 306 and/or a server 310 for subsequent retrieval and use.

In an example implementation, the received set of identity information may also include information that may directly or indirectly identify certain characteristics about the communication channel and/or device 304 used by the subject 302, such as a phone number, IP address, MAC address, location, signal-to-noise, unique browser configuration, operating system, installed fonts, installed plug-ins, etc. In an example implementation, the characteristics about the communication channel or device 304 may be utilized in conjunction with the basic details received from the subject 302 to determine one or more of:

- if the received phone number associated with the communication channel or device 304 differs or is altered in some way from the originating device phone number (i.e. spoofed);
- if the subject's 302 communication device 304 is located where it would be expected to be (i.e., within the home city or state of the subject 302);
- if the subject's 302 communication device 304 is located in a region associated with a high crime rate;
- if the subject's 302 communication device 304 is located in a foreign country;
- details about the subject's 302 communication device 304 (i.e., device fingerprinting) that may be corroborated by independent information.

According to an example implementation of the disclosed technology, the information received, gathered, and/or determined may be analyzed, compared, etc., to calculate a fraud risk score. In an example implementation, if the fraud risk score is determined to exceed a threshold (i.e., to be more risky than acceptable), the process 300 may prevent or block additional authentication steps and an indication of failure may be output. For example, in situations where the risk is determined to be higher than acceptable, the subject 302 may be presented with other options or instructions to validate his or her identity.

In certain example implementations, initiating the initial and/or additional authentication process steps may be based on company or governmental oversight policy rather than on a risk score. For example, in order to conform to certain state laws, an authentication challenge method to verify identity may need to be based on commercially reasonable tools. In other situations, and depending on the particular business policy, certain transactions may require a specific type of authentication. For example, certain banks may require authentication with a KBA challenge question for balance transfers over $10,000.

Certain example implementations of the disclosed identity authentication process 300 may be described in terms of multiple stages, for example, as shown by the boxed numerals [1], [2], [3], [4], and [5] in FIG. 3. Stage [1], for example, may include receiving a set of identity information associated with a subject 302. According to an example implementation, the set of identity information may include the above-referenced characteristics about the communication channel or device 304. Such information may be received via a cloud or Internet communication channel 308. In one example implementation, the set of identity information may be received at a server 310 in response to input from a subject 302. In another example implementation, the set of identity information may be received at a server 310 via a vendor 306 in communication with the subject 302.

In accordance with an example implementation, a vendor 306 may connect to the cloud or Internet communication channel 308 through a similar list of its own communication channel or device 304. For example, the vendor 306 may have its own web server or mobile device that connects to the cloud or Internet communication channel 308 using a variety of device options.

According to an example implementation of the disclosed technology, Stage [2] of the process 300 may include querying one or more databases with at least a portion of the set of identity information to obtain personally identifiable information. For example, the one or more databases may include one or more of the following: a public or private database 314, a database associated with a governmental entity 316, a database associated with a utility company 318, a database associated with a financial institution 320, a database associated with a credit bureau 322, etc. In an example implementation, information obtained from one or more of the databases 314-322 (for example, via a cloud, network and/or Internet connection 312) may be stored on a server 310 and indexed in a database associated with the server 310.

According to an example implementation of the disclosed technology, Stage [3] of the process 300 may include producing, based at least in part on the personally identifiable information, at least one KBA question having a personally identifiable correct answer. In certain example implementations, Stage [3] may also include generating a unique correct one-time pass (OTP) code for the personally identifiable correct answer. In certain example implementations, Stage [3] may also include generating one or more incorrect answers with corresponding incorrect codes. According to an example implementation of the disclosed technology, the generation of the KBA question and/or the OTP answers and codes may be performed by the server 310.

According to an example implementation of the disclosed technology, Stage [4] of the process 300 may include outputting, via a first communication channel, the at least one KBA identity proofing question. In certain example implementations, Stage [4] may include outputting, via a second communication channel, the personally identifiable correct answer with the unique correct OTP code, and the one or more incorrect answers with corresponding incorrect alphanumeric codes. In certain example implementations, Stage [4] may include receiving a response code and comparing the response code and the unique correct OTP code.

According to an example implementation of the disclosed technology, Stage [5] of the process 300 may include outputting a first indication of authentication responsive to a match between the response code and the unique correct OTP code. Depending on the analysis of the various response codes or other factors where risk is determined to be higher than acceptable, the subject 302 may be presented with other options or instructions to validate his or her identity. For example, certain embodiments may include online or offline capture of identification documents (such as a driver's license, social security card, credit card, bankcard, utility bill, tax return, etc.) for further identity verification.

In accordance with an example implementation, the identity authentication process 300 may utilize all or part of the previously gathered, compared, analyzed, and/or scored information to determine a fraud risk score. In certain example implementations, the fraud risk score may provide additional confidence for accepting or rejecting the authentication.

In accordance with an example implementation, the identity authentication process 300 may utilize all or part of the previously gathered, compared, analyzed, and/or scored information to refine the model, for example, by a decision tree as previously discussed.

According to an example implementation of the disclosed technology, if the received response answer or code is determined to correspond to the correct answer or OTP code for the personally identifiable correct answer, the process 300 may further include initiating biometric capture of the subject. For example, in certain example implementations, biometric capture may be used to associate the subject 302 identity information with some type of physically verifiable (biometric) information, such as a fingerprint, a voiceprint, an iris image, a facial image, etc.

In certain example implementations, once the subject 302 satisfactorily completes the authentication process 300, future access to an account, benefit and/or service may be granted based on information such as a device ID, biometric information, etc., without having to repeat a full re-authentication process. In certain example implementations, additional verification and/or identity proofing may be triggered before granting access to an account, benefit and/or service. For example, if an authenticated subject 302 attempts to access their account from a different or unknown device or communications channel 304, one or more of the previously described Stages [1]-[5] may be repeated. In certain example embodiments, periodic identity proofing questions, one-time passwords, multi-factor authorization, etc., may be presented to the subject 302 for completion before access to the account or service is granted.

Figure 4:
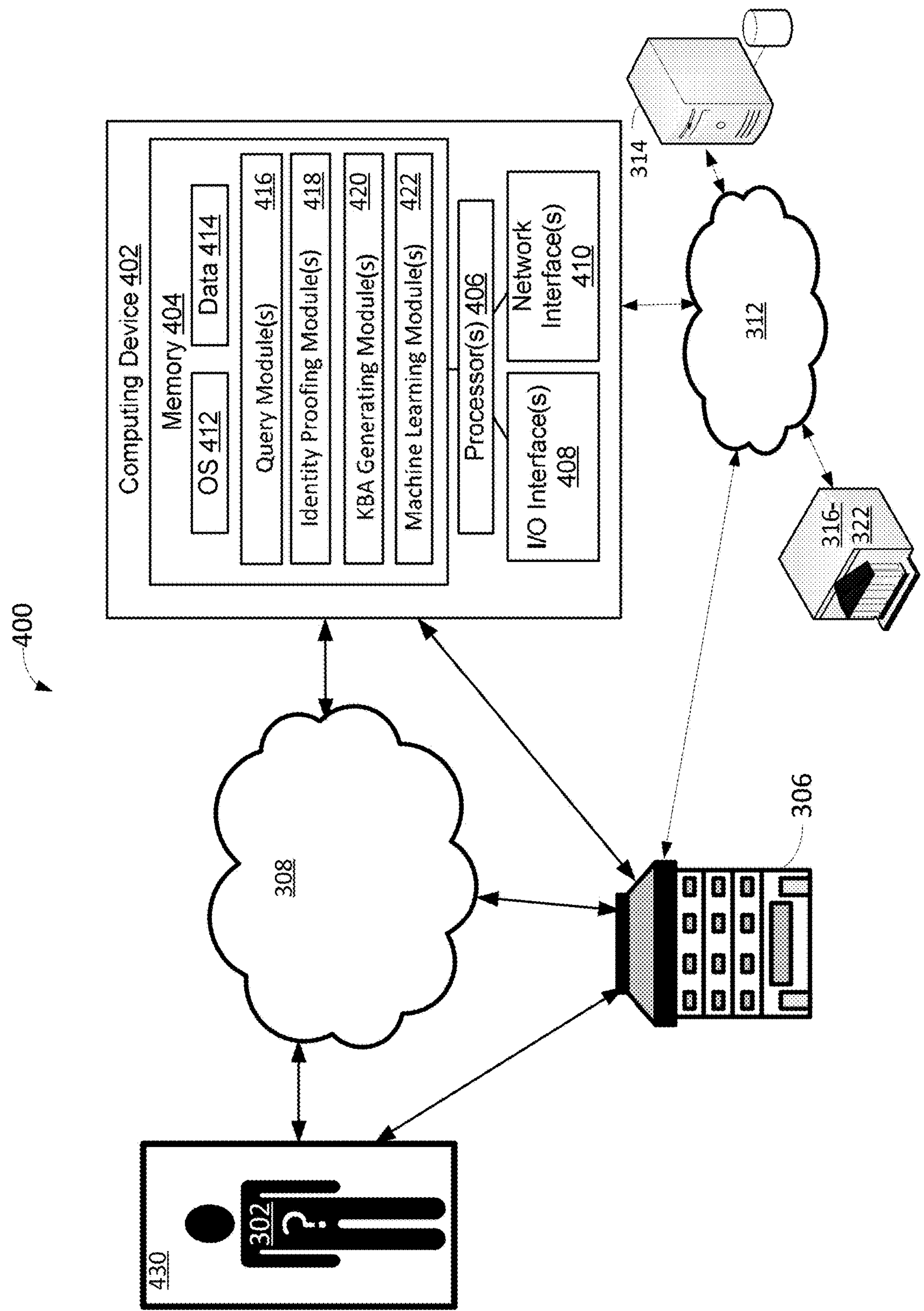
FIG. 4 is a block diagram of an example system 400 for implementing an identity authentication process according to an example implementation of the disclosed technology.

FIG. 4 is a block diagram of an example system 400 for implementing an identity authentication process, according to an example implementation of the disclosed technology. The system 400 may utilize a computing device 402 for handling various aspects of the process, including communicating with the various entities and/or external systems involved in the authentication process. For example, the computing device 402 may communicate via one or more cloud, Internet, or other network channels 308 312 to send and/or receive information. For example, the computing device 402 may receive identity information 430 related to the subject 302. Such identity information 430 may include a set of identity information received from the subject 302 (for example, to initiate the authentication process) as well as independent information received in response to querying one or more public or private databases 314 316-322.

In certain example implementations, the computing device may include one or more input/output interfaces 408 and/or network interfaces 410 for communicating with the various systems and/or entities in the authentication process. According to an example implementation of the disclosed technology, the computing device 402 may be in communication with clients or vendors 306, either directly, or via a cloud, Internet, or other network channel 308 312. For example, a subject 302 seeking to open an account or to do business with a particular vendor 306 may need to go through an authorization process dictated by the vendor 306, where one or more authentication steps or stages are handled by the system 400.

In certain example implementations, the computing device 402 may be utilized to initiate authentication and/or receive information from various devices, including but not limited to card readers, fingerprint scanners, text input devices, cameras, microphones, etc. In certain example implementations of the disclosed technology, the computing device may receive information such as passcodes, authentication query responses, and/or data representative of biometric information (such as fingerprint or voiceprint information).

In an example implementation, the computing device 402 may include memory 404 in communication with one or more processors 406. The memory 404 may be configured to host an operating system 412 and data 414. Certain example implementations of the disclosed technology may include various modules 416 418 420 422 for processing the various stages of the authentication process. For example, the memory 404 may include one or more query modules 416 for formatting KBA questions. In certain example implementations, the query module 416 may be utilized to dictate which communication channels are utilized for presenting the KBA question and for receiving answers and/or OTP codes.

In an example implementation, the memory 404 may include one or more query modules 416, for handling communication details of the questioning and answering. In certain example implementations, the memory 404 may include one or more identity proofing modules 418, for example, to compare the KBA response answer to a (correct) answer previously provided by the subject 302. In certain example implementations of the disclosed technology, the memory 404 may include one or more KBA generating modules 420, for example, to generate a unique correct one-time pass (OTP) code for the personally identifiable correct answer, and/or for generating one or more incorrect answers with corresponding incorrect codes. According to an example implementation of the disclosed technology, the computing device 402 may be configured with one or more Machine Learning modules 422, for example, to produce and/or refine the KBA questions.

Figure 5:
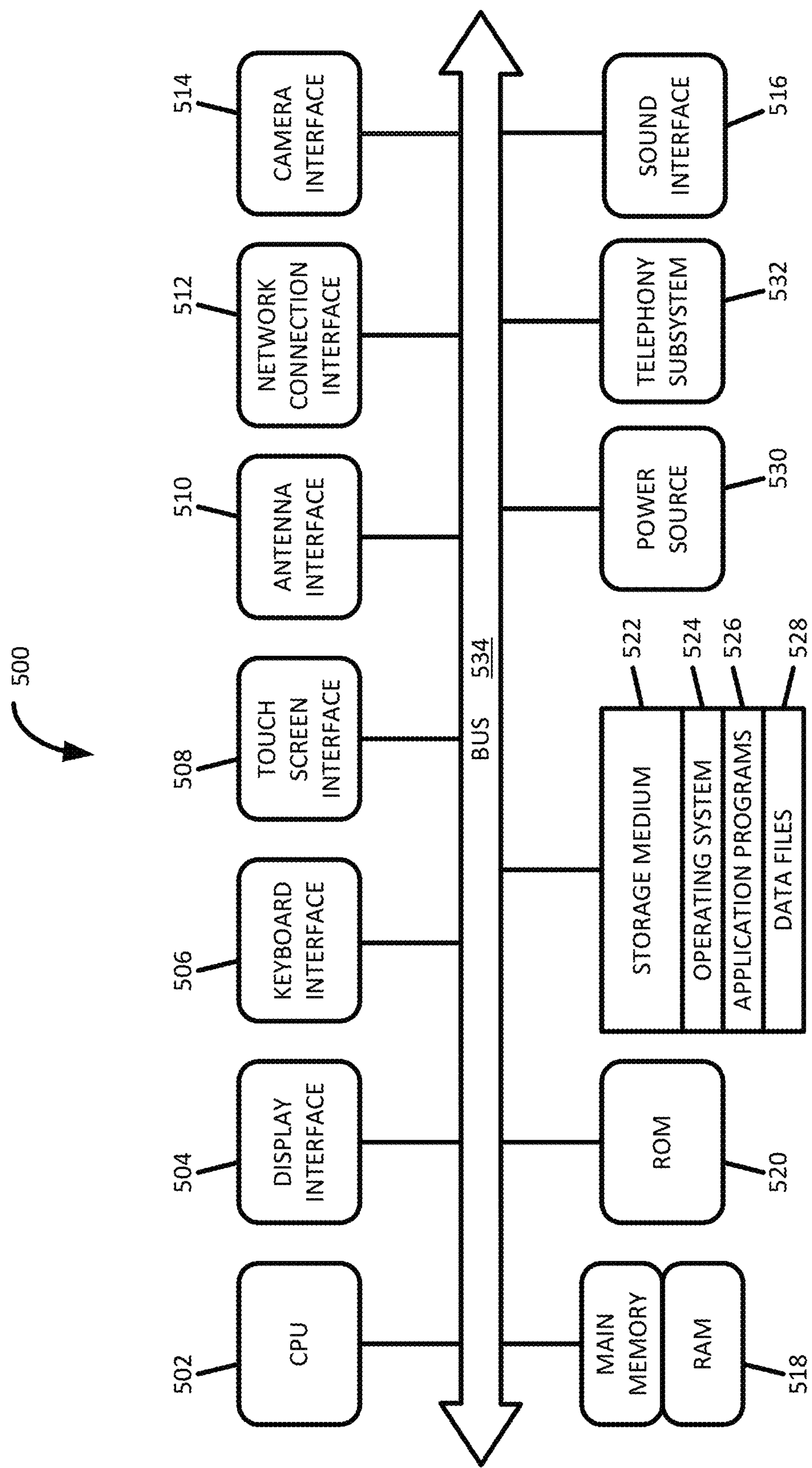
FIG. 5 is a block diagram of a computing device 500, according to an example implementation of the disclosed technology.

FIG. 5 is a block diagram of an illustrative computing device 500, according to an example implementation of the disclosed technology. In certain example implementations, the computing device 500 may be embodied as the computing device 402, as shown in FIG. 4. The computing device 500 of FIG. 5 includes a central processing unit (CPU) 502, where computer instructions are processed; a display interface 504 that acts as a communication interface and provides functions for rendering video, graphics, images, and texts on the display. In certain example implementations of the disclosed technology, the display interface 504 may be directly connected to a local display, such as a touch-screen display associated with a mobile computing device. In another example implementation, the display interface 504 may be configured for providing data, images, and other information for an external/remote display that is not necessarily physically connected to the computing device. For example, a desktop monitor may be utilized for mirroring graphics and other information that is presented on the computing device 500. In certain example implementations, the display interface 504 may wirelessly communicate, for example, via a Wi-Fi channel or other available network connection interface 512 to an external/remote display.

In an example implementation, the network connection interface 512 may be configured as a communication interface, for example, to provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 500 may include a keyboard interface 506 that provides a communication interface to a keyboard. In one example implementation, the computing device 500 may include a pointing device and/or touch screen interface 508. According to certain example implementations of the disclosed technology, the pointing device and/or touch screen interface 508 may provide a communication interface to various devices such as a pointing device, a touch screen, a depth camera, etc. which may or may not be associated with a display.

The computing device 500 may be configured to use an input device via one or more of input/output interfaces (for example, the keyboard interface 506, the display interface 504, the touch screen interface 508, network connection interface 512, camera interface 514, sound interface 516, etc.) to allow a user to capture information into the computing device 500. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor such as an accelerometer or gyroscope, a smartcard, iris reader, fingerprint reader, voiceprint reader, and the like. Additionally, the input device may be integrated with the computing device 500 or may be a separate device.

Example implementations of the computing device 500 may include an antenna interface 510 that provides a communication interface to an antenna; a network connection interface 512 that provides a communication interface to a network. In certain implementations, a camera interface 514 is provided for capturing digital images, for example, from a camera. In certain implementations, a sound interface 516 is provided as a communication interface for converting sound into electrical signals using a microphone and for converting electrical signals into sound using a speaker. According to example implementations, a random-access memory (RAM) 518 is provided, where computer instructions and data may be stored in a volatile memory device for processing by the CPU 502.

According to an example implementation, the computing device 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, an invoice extraction module, etc.) and data files 528 are stored. According to an example implementation, the computing device 500 includes a power source 530 that provides an appropriate alternating current (AC) or direct current (DC) to power components. According to an example implementation, the computing device 500 may include and a telephony subsystem 532 that allows the device 500 to transmit and receive sound over a telephone network. The constituent devices and the CPU 502 communicate with each other over a bus 534.

In accordance with an example implementation, the CPU 502 has an appropriate structure to be a computer processor. In one arrangement, the computer CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 in order to execute software programs. Data may be stored in the RAM 518, where the data may be accessed by the computer CPU 502 during execution. In one example configuration, the device 500 includes at least 128 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 500 to access computer-executable process steps, application programs and the like (such as the modules 416-422 as discussed with respect to FIG. 4) that are stored on removable and non-removable memory media, to off-load data from the device 500 or to upload data onto the device 500. A computer program product, such as one utilizing a communication system may be tangibly embodied in storage medium 522, which may comprise a machine-readable storage medium.

Various implementations of the communication systems and methods herein may be embodied in non-transitory computer-readable media for execution by a processor. An example implementation may be used in an application of a mobile computing device, such as a smartphone or tablet, but other computing devices may also be used, such as portable computers, tablet PCs, Internet tablets, PDAs, ultra-mobile PCs (UMPCs), etc.

As may be understood, there no limit on types of KBA questions that can be presented to a subject. Thus, the number of multiple-choice answers presented with the KBA questions is also not limited. In one example implementation, two KBA questions may be used, each with its set of codes to reduce the threat of authenticating someone who has stolen the device and is guessing the answer. For example, if the first KBA question includes five multiple-choice answers, the person being validated has 20% chance of guessing the correct answer. If another KBA question is posed with five more multiple-choice questions, the person being validated may have a 4% chance of correctly guessing both answers by random selection. In another example implementation, to reduce the likelihood of guessing correctly, a KBA question may be posed with more multiple-choice answers (such as 10 or 20 answers to choose from). The questions can be presented one at a time in a loop until pass/fail criteria are achieved.

In another example implementation, two KBA questions may be presented in order with a corresponding set of answers, and code entry instructions such as "what is the correct answer code to the first question?" and "what is the correct answer code to the second question?" The subject may then utilize the same answer set but may be required to enter the right code for the right question in the right order.

Certain example implementations of the disclosed technology may enable effective determination and management of identity fraud risk. Certain implementations may be utilized to detect suspicious and/or fraudulent activities associated with the process of establishing a new account. For example, a subject seeking to establish a new account (such as a credit account, banking account, utility account, etc.) or apply for a benefit or service (such as a tax refund, etc.) may provide a basic set of identity information such as a name, address, telephone number, social security number, etc. In an example implementation, all or part of the set of identity information may be utilized to query one or more public and/or private databases to obtain independent information. In certain example implementations, the independent information may be processed to determine/detect/score indicators of risk. According to an example implementation of the disclosed technology, account applicants who fail the authentication may not be allowed to proceed.

Certain example embodiments of the disclosed technology may allow for offline, manual, and/or custom validation of a subject's identity when the subject fails the authentication. For example, certain legitimate subjects may fail due to various factors. In these situations, it may be possible to obtain the appropriate authentication by offline, manual, and/or custom validation. For example, in one implementation, a subject who fails authentication may be asked to provide additional proof of their identity. In another example implementation, a subject who fails one of the stages may be asked to appear in person at a vendor location for further questioning and/or documentation.

Certain embodiments utilize non-fair credit reporting act (non-FCRA) implementations, for example, so if a subject fails one or more stages, such information will not be utilized for denying employment, credit, etc. In such situations, a vendor for which the subject is seeking authentication may provide other offline, manual, and/or custom validation options. However, if the subject passes the authentication, then the process may be utilized to initiate the authentication, such as biometric authentication. Furthermore, if the subject passes the authentication process, certain implementations of the disclosed technology may provide an efficient means for identity authentication.

Certain example implementations may identify specific types of possible identity fraud and risk levels associated with a subject. For example, personal information submitted with an application may be analyzed with respect to available information in public and/or non-public records to determine the authenticity of the subject's identity and/or the applicant data. According to certain implementations, the analysis may involve comparisons on multiple levels using models specific to the type of risk identified. According to certain implementations, the analysis may further identify discrepancies (if any), categorize the type of possible fraud, score the risk of fraud, and/or further evaluate the application information based on the type of risk.

Certain example implementations of the disclosed technology use a one-time password (OTP), which can refer to a password that can be used by a subject to authenticate an account or service. In one example implementation, a subject may only use the OTP a single time so that future access to the account cannot be gained by the use of the same OTP. In certain example implementations, the OPT can be set to expire within a predetermined period. In an example implementation, the OTP may be utilized to authenticate a service or account. For example, a subject may be asked to provide the OTP to access a service, or when a specific transaction is performed. Examples of use cases where the OTP may be utilized include online banking services, a telephone banking service, an interactive voice response (IVR) banking service, a credit card service, a bill payment service, or any other service in which a subject is able to provide and/or receive sensitive information.

In certain example implementations, the OTPs generated by the authentication system can take on various forms. For example, in one implementation, the OTPs may be six characters in length and may include only numeric characters. Alternatively, in another implementation, each of the OTPs may be eight characters in length and may include case sensitive alphanumeric characters. In an example implementation, a first OTP may include five numeric characters, a second OTP may include four alphabetical characters, a third OTP may include seven alphanumeric characters, a fourth OTP may include five symbols, and so on. In certain example implementations, the OTPs can include any other number of characters and/or can include any combination of letters, numerals, and symbols.

According to certain example implementations of the disclosed technology, the identity authentication may be based on independent information, for example: whether the identity information has previously been reported; whether the address on the application matches an address previously reported; whether the social security number on the application has been previously reported with a different identity; whether the identity has only been reported by credit bureau sources; whether the identity has been the subject of recent account opening inquiries; or whether the identity has a history of derogatory or high-risk events. According to an example implementation, other additional independent information may be utilized without departing from the scope of the disclosed technology.

In certain example implementations, the independent information may include source records such as property deeds, credit bureau identity files, utility connects and disconnects, driver licenses, voter registrations, phone book directories, etc. Example implementations of the disclosed technology may aggregate and process such information to locate inconsistencies and/or patterns that may further identify certain types of identity fraud.

In an example implementation, a risk score, a risk type, and/or warning codes may be generated at one or more stages of the multi-stage identity authentication process. For example, the risk score may indicate a likelihood that an application or request for service will result in fraud if the account is opened.

In accordance with certain example implementations of the disclosed technology, the applicant- or subject-supplied initial set of identifying information (such as personal identity information) may be analyzed to determine if such information corresponds to conditions that indicate high identity fraud risk. For example, a social security number (SSN) can be checked to determine if it is valid or not. An invalid SSN, a SSN supplied by the applicant that corresponds to a person who has been reported as deceased, an SSN issued prior to the applicant's date-of-birth; and/or a SSN used by multiple different identities would all be indicators of high identity fraud risk. Another indicator of high identity fraud risk includes multiple suspicious identities at the applicant's address. In certain example implementations, such factors may be taken into account to allow or deny the combined KBA/OTP authentication process to continue.

According to example implementations, the applicant's residential address history may be taken into account for determining identity fraud risk. For example, the length of residence at one or more addresses, the number of address moves, and/or the number of utility connects and disconnects may be indicators of identity fraud.

According to example implementations, certain technical effects can be provided, such as creating certain systems and methods that may reduce fraud losses and improve operational efficiency. Example implementations of the disclosed technology can provide the further technical effects of providing systems and methods for detecting identity fraud. Certain implementations of the disclosed technology may further provide the technical effects of authenticating a subject's identity via a KBA process. Certain implementations of the disclosed technology may further provide the technical effects of improving KBA questions and associated topics to correspond with certain characteristics of the subject or applicant. In certain example implementations, the improved KBA questions may increase the likelihood of a subject correctly answering a KBA question without decreasing the security of the authentication process.

Figure 6:
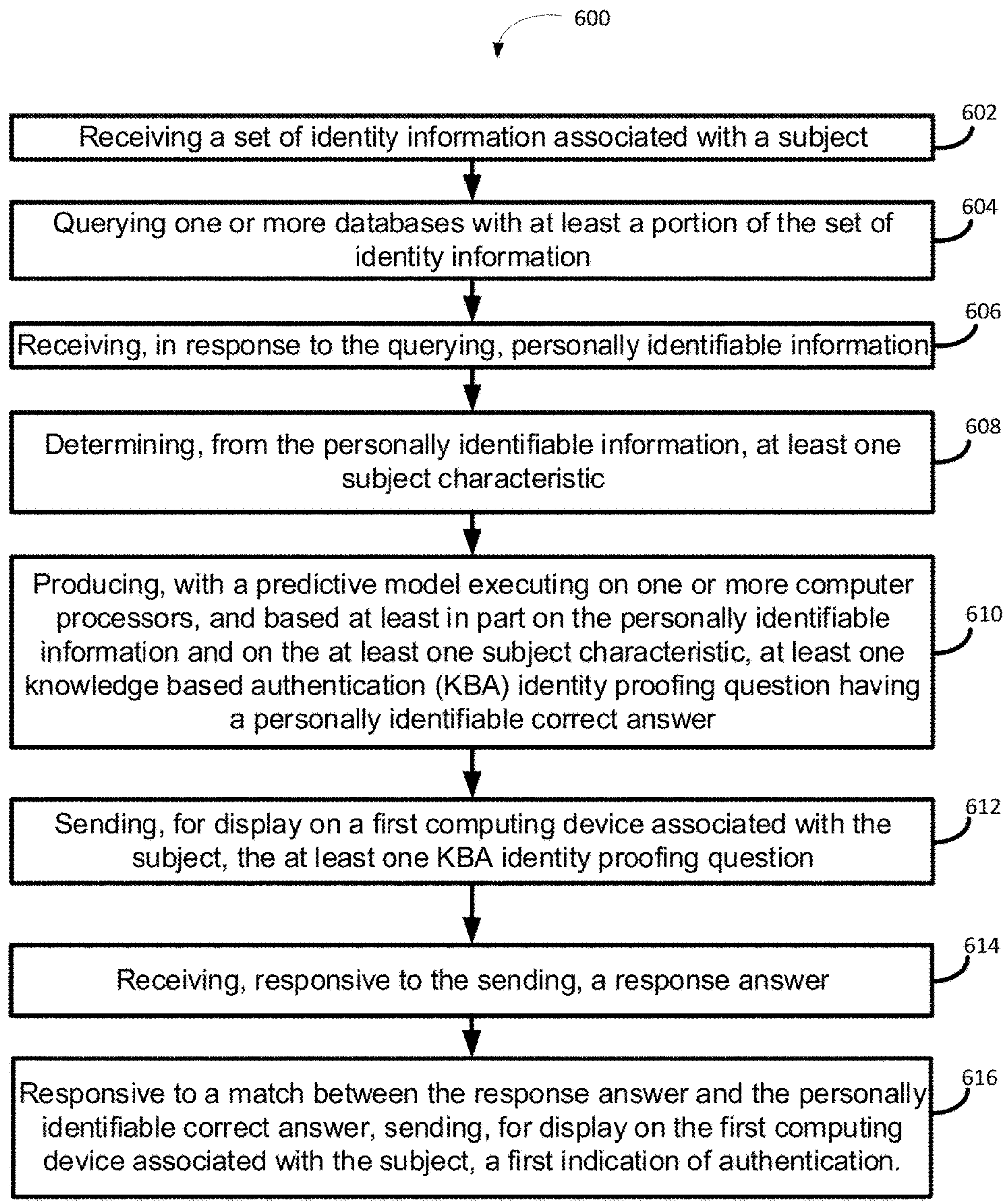
FIG. 6 is a flow diagram of a method 600, according to an example implementation of the disclosed technology.

FIG. 6 is a flow diagram of a method 600, according to an example implementation of the disclosed technology. The method 600 begins in block 602 and includes receiving a set of identity information associated with a subject. In block 604, the method 600 includes querying one or more databases with at least a portion of the set of identity information. In block 606, the method 600 includes receiving, in response to the querying, personally identifiable information. In block 608, the method 600 includes determining, from the personally identifiable information, at least one subject characteristic. In block 610, method 600 includes producing, with a predictive model executing on one or more computer processors, and based at least in part on the personally identifiable information and on the at least one subject characteristic, at least one knowledge-based authentication (KBA) identity proofing question having a personally identifiable correct answer. In block 612, the method 600 includes sending, for display on a first computing device associated with the subject, the at least one KBA identity proofing question. In block 614, the method 600 includes receiving, responsive to the sending, a response answer. In block 616, the method 600 includes sending, for display on the first computing device associated with the subject, and responsive to a match between the response answer and the personally identifiable correct answer, a first indication of authentication.

Certain example implementations of the disclosed technology may further include refining the predictive model based on the match or a mismatch between the response answer and the personally identifiable correct answer. Certain example implementations may include refining the predictive model based on a history of matches between the response answer and the personally identifiable correct answer to produce KBA identity proofing questions that increase the probability of a match. In certain example implementations, refining the predictive model can include applying decision tree learning. In certain example implementations, applying the decision tree learning comprises applying an ID4.5 algorithm.

In accordance with an example implementation of the disclosed technology, producing the KBA identity proofing question can include selecting a question topic from a plurality of topics based on the at least one subject characteristic. In an example implementation, a question topic may be selected from one or more of: residence-related topics, vehicle-related topics, birthdate-related topics, corporate affiliation-related topics, and personal information-related topics.

According to an example implementation of the disclosed technology, the subject characteristic can include characteristics related to one or more of: age, gender, culture, residence, vehicle, subject history, and a personal communication device.

According to an example implementation of the disclosed technology, the characteristic related to the first computing device can include one or more of: a phone number, an IP address, a MAC address, a location, an indication of signal-to-noise, browser configuration information, operating system information, a listing of installed fonts, and a listing of installed plug-ins.

In certain example implementations, an indication may be sent for display on the first computing device associated with the subject to communicate an authentication failure responsive to a determined mismatch between the at least one identifier and at least a portion of the set of identity information associated with the subject.

In an example implementation, at least one KBA identity proofing question may be sent via a first communication channel, and wherein a corresponding personally identifiable correct answer may be sent via a second communication channel In an example implementation, the first and second communication channel is the same communication channel In an example implementation, the first communication channel is configured for communication with a first computing device associated with the subject, and wherein the second communication channel is configured for communication with a second computing device associated with the subject.

In certain example implementations, receiving the set of identity information can include receiving, as applicable, one or more of: a name, an address, a birth date, a phone number, at least portion of a social security number, an IP address, a location, and a communication device electronic fingerprint.

Certain example implementations may include receiving new biometric information associated with the subject. An example implementation includes querying one or more databases for previously stored biometric information associated with the subject. An example implementation includes comparing the new biometric information with the previously stored biometric information. Responsive to a match between the new and previously stored biometric information, an example implementation includes outputting a second indication of authentication.

According to an example implementation of the disclosed technology, the biometric information can include one or more of a fingerprint image, a voiceprint, a facial feature image, and an iris image.

In example implementations of the disclosed technology, the identity authentication process may be implemented using any number of hardware and/or software applications that are executed to facilitate any of the operations. In example implementations, one or more I/O interfaces may facilitate communication between the identity authentication system and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the identity authentication system. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the identity authentication system inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network any wired network, any wireless network, etc., for communication with external devices and/or systems.

As desired, implementations of the disclosed technology may include an identity authentication system 300 with more or less of the components illustrated in FIG. 3, FIG. 4 or FIG. 5.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:

receiving a set of identity information associated with a subject, the set of identity information comprising location information;

querying one or more databases with at least a portion of the set of identity information;

receiving, in response to the querying, personally identifiable information;

determining, from the personally identifiable information, one or more subject characteristics of the subject, the one or more subject characteristics comprising an attribute and a value related to residence information of the subject;

splitting the one or more subject characteristic into at least two subsets, each subset representing a different value or range of values associated with the attribute;

ranking, by a predictive model executing on one or more computer processors, a plurality of question topics, the ranking based on the different values or range of values associated with the at least two subsets of the one or more subject characteristics and based on the residence information of the subject;

selecting, based on the ranking, at least one knowledge-based authentication (KBA) identity proofing question for presentation to the subject, the at least one KBA identity proofing question having a personally identifiable correct answer;

sending, for display on a first computing device associated with the subject, the at least one KBA identity proofing question;

receiving, responsive to the sending, a response answer; and responsive to a match between the response answer and the personally identifiable correct answer, sending, for display on the first computing device associated with the subject, a first indication of authentication.

2. The method of claim 1, further comprising sending, for display on the first computing device associated with the subject, an indication of authentication failure based on a mismatch of the residence information and the location information.

3. The method of claim 1, further comprising refining the predictive model to produce KBA identity proofing questions that increase a probability of a match based on one or more of a history of matches between the response answer and the personally identifiable correct answer, the match or a mismatch between the response answer and the personally identifiable correct answer, and associated pass rate metrics.

4. The method of claim 1, wherein receiving the response answer outside of a predefined time period of the sending of the at least one KBA identity proofing question causes one or more of discarding the KBA identity proofing question and evaluating the response answer as a mismatch.

5. The method of claim 1, further comprising refining the predictive model by applying decision tree learning.

6. The method of claim 1, wherein ranking the plurality of question topics is further based on at least one business or landmark corresponding to a residence city of the subject.

7. The method of claim 1, wherein the one or more subject characteristics comprise a characteristic related to one or more of: age, culture, gender, property transaction count, previous address count, frequency of address moves, vehicle, subject history, and the first computing device.

8. The method of claim 7, wherein the characteristic related to the first computing device comprises one or more of: a phone number, an Internet Protocol (IP) address, a Media Access Control (MAC) address, a location, an indication of signal-to-noise, browser configuration information, operating system information, a listing of installed fonts, and a listing of installed plug-ins.

9. The method of claim 1, further comprising sending, for display on the first computing device associated with the subject, an indication of authentication failure responsive to a determined mismatch between the response answer and the personally identifiable correct answer.

10. The method of claim 1, wherein receiving the set of identity information comprises receiving one or more of: a name, an address, a gender, a birth date, a phone number, at least portion of a social security number, an IP address, a location, and a communication device electronic fingerprint.

11. A system comprising:

one or more processors;

memory in communication with the one or more processors;

instructions stored in the memory that, when executed by the one or more processors, cause the system to:

receive a set of identity information associated with a subject, the set of identity information comprising location information;

query one or more databases with at least a portion of the set of identity information;

receive, in response to the query, personally identifiable information;

determine, from the personally identifiable information, one or more subject characteristics of the subject, the one or more subject characteristics comprising an attribute and a value related to residence information of the subject;

split the one or more subject characteristic into at least two subsets, each subset representing a different value or range of values associated with the attribute;

rank, by a predictive model executing on one or more computer processors, a plurality of question topics based on the different values or range of values associated with the at least two subsets of the one or more subject characteristics and based on the residence information of the subject;

select, based on the ranking, at least one knowledge-based authentication (KBA) identity proofing question for presentation to the subject, the at least one KBA identity proofing question having a personally identifiable correct answer;

send, for display on a first computing device associated with the subject, the at least one KBA identity proofing question;

receive a response answer; and responsive to a match between the response answer and the personally identifiable correct answer, send, for display on the first computing device associated with the subject, a first indication of authentication.

12. The system of claim 11, wherein the instructions further cause the one or more processors to send, for display on the first computing device associated with the subject, an indication of authentication failure based on a mismatch of the residence information and the location information.

13. The system of claim 11, wherein the instructions further cause the one or more processors to refine the predictive model to produce KBA identity proofing questions that increase a probability of a match based on one or more of a history of matches between the response answer and the personally identifiable correct answer, the match or a mismatch between the response answer and the personally identifiable correct answer, and associated pass rate metrics.

14. The system of claim 11, wherein the instructions further cause the one or more processors to evaluate the response answer as a mismatch responsive to receiving the response answer after a predefined time period has elapsed since the at least one KBA identity proofing question was sent.

15. The system of claim 11, wherein the one or more subject characteristics comprise a characteristic related to one or more of: gender, culture, property transaction count, previous address count, frequency of address moves, vehicle, subject history, and the first computing device.

16. The system of claim 15, wherein the characteristic related to the first computing device comprises one or more of: a phone number, an Internet Protocol (IP) address, a Media Access Control (MAC) address, a location, an indication of signal-to-noise, browser configuration information, operating system information, a listing of installed fonts, and a listing of installed plug-ins.

17. The system of claim 11, wherein the instructions further cause the one or more processors to send, for display on the first computing device associated with the subject, an indication of authentication failure responsive to a determined mismatch between the response answer and the personally identifiable correct answer.

18. A non-transient computer-readable medium storing instructions, that when executed by a user device having one or more processors, cause the one or more processors to perform a method comprising:

receiving a set of identity information associated with a subject, the set of identity information comprising location information;

querying one or more databases with at least a portion of the set of identity information;

receiving, in response to the querying, personally identifiable information;

determining, from the personally identifiable information, one or more subject characteristics of the subject, the one or more subject characteristics comprising an attribute and a value related to residence information of the subject;

splitting the one or more subject characteristic into at least two subsets, each subset representing a different value or range of values associated with the attribute;

ranking, by a predictive model executing on one or more computer processors, a plurality of question topics, the ranking based on the different values or range of values associated with the at least two subsets of the one or more subject characteristics and based on the residence information of the subject;

selecting, based on the ranking, at least one knowledge-based authentication (KBA) identity proofing question for presentation to the subject, the at least one KBA identity proofing question having a personally identifiable correct answer;

sending, for display on a first computing device associated with the subject, the at least one KBA identity proofing question;

receiving, responsive to the sending, a response answer; and responsive to a match between the response answer and the personally identifiable correct answer, sending, for display on the first computing device associated with the subject, a first indication of authentication.

19. The non-transient computer-readable medium of claim 18, further comprising ranking the plurality of question topics based on pass rate metrics.

20. The non-transient computer-readable medium of claim 18, further comprising sending, for display on the first computing device associated with the subject, an indication of authentication failure based on a mismatch of the residence information and the location information.

* * * * *